March 8, 1949.  H. R. LUBCKE  2,463,785
ELECTROMECHANICAL DEVICE
Filed Nov. 23, 1945

WITNESSES:
William S. Klein
Marjorie J. Campbell

INVENTOR.
Harry R. Lubcke

Patented Mar. 8, 1949

2,463,785

UNITED STATES PATENT OFFICE 2,463,785

ELECTROMECHANICAL DEVICE

Harry R. Lubcke, Hollywood, Calif., assignor to Thomas S. Lee Enterprises, Inc., Los Angeles, Calif., a corporation of California Application November 23, 1945, Serial No. 630,533

16 Claims. (Cl. 172—126)

This invention relates to means for obtaining mechanical motion of an element in plural dimensions. This is accomplished by suitably disposed current-carrying conductors within a single posed magnetic field.

An object of this invention is to obtain mechanical motion in plural dimensions within a single magnetic field.

Another object of this invention is to obtain mechanical motion in plural dimensions while positioning a useful plane surface so that it includes the axes of rotation.

Still another object of this invention is to obtain a mechanical motion in plural dimensions without linkages, cams, eccentrics, or other complicated parts.

Still another object of this invention is to provide a configuration in which the actuating force is efficiently and conveniently applied to the useful means.

A final object of this invention is to provide an electro-magnetic device capable of producing motion in plural dimensions which does not employ commutators or electrical sliding contacts.

The ways in which these objects are attained is illustrated in the accompanying drawings in which Fig. 1 shows a plan view of a typical embodiment of the device.

It will be recognized that simple electrical means for producing a motion of a working area in plural dimensions finds wide application. In the field of optics a mirror given such motion is capable of scanning an area. This is directly applicable to television. In the typical embodiment here presented, it will be recognized that the mirror may be made of considerable size so that a whole cone of optical information, such as that formed by a lens, may be deflected in plural dimensions. It will be further recognized that the plane of the mirror may be made coincident with the axes of rotation. This prevents optical distortion caused by the mirror being off the axes of rotation commonly found in similar devices which employ universal joints for supporting the mirror.

Numerous other applications of the principle of this invention will be recognized, such as in the field of telautography where spatial information in two dimensions is sought; for vibrating or sorting materials; and for directing light beams as in telephotography and the like.

Figure 1:
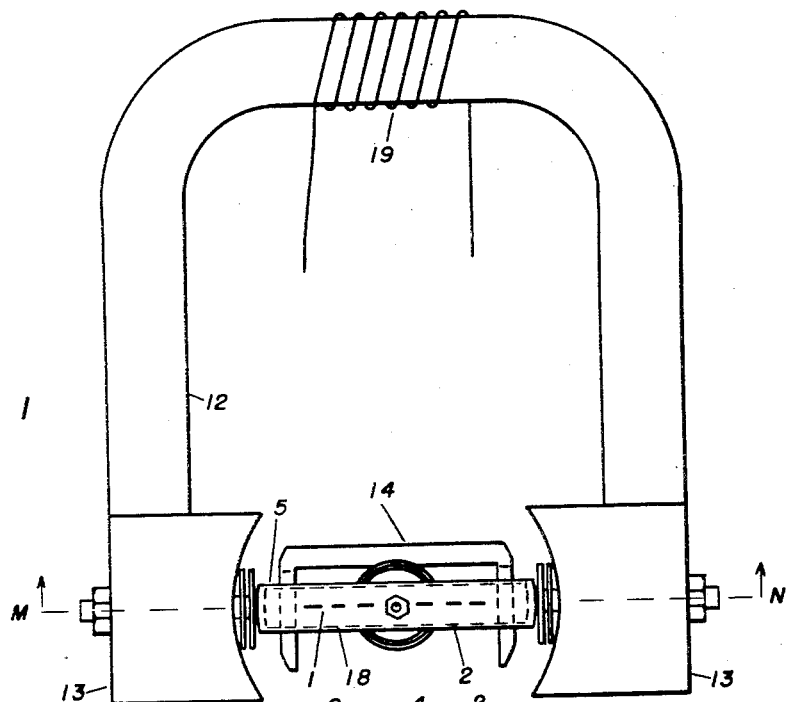

Referring now to Fig. 1, numeral 1 indicates the useful surface, such as a mirror. This is supported by a coil form 2 of approximately square cross-section and having one or more layers of cross-section and winding of an electrical conductor around the periphery.

Figure 2:
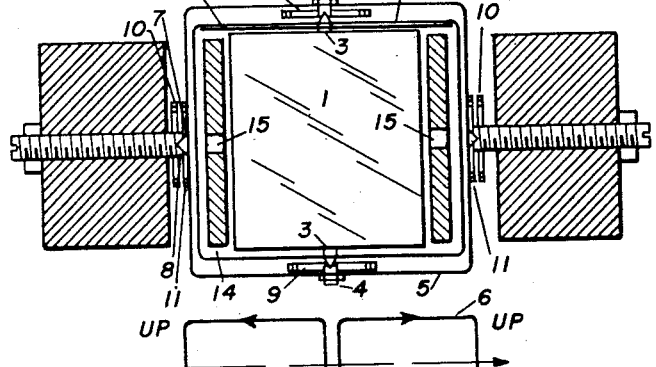
Fig. 2 shows a sectional elevation of the device taken along plane MN in Fig. 1.

Referring now to Fig. 2, the coil 2 is seen to be supported by pivots 3 in bearings 4. This construction is similar to that of a D'Arsonval meter movement. However, instead of bearings 4 being mounted on a stationary member, they are attached to the frame 5. This is of similar cross-section to coil 2 and surrounds the same. Frame 5 is provided with a coil of conductor 6, the winding diagram of which is given in Fig. 3.

Figure 3:
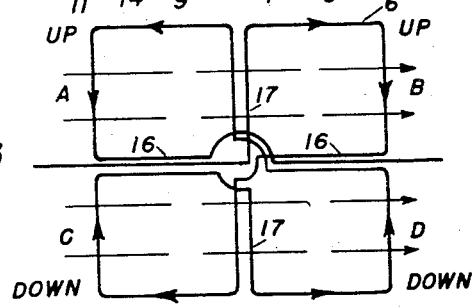
Fig. 3 shows the winding diagram for the frame coil.

In Fig. 3 the direction of a single magnetic field is indicated by the horizontal arrows pointing from left to right and the direction of electric current at a chosen instant is shown by arrows upon the conductor 6, which is a continuous winding.

The motion of conductor 6 and consequently of frame 5 will be according to the well-known "motor rule." If the forefinger of the left-hand is made to coincide with the direction of the lines of force, and the middle finger with the direction of the current, the thumb points in the direction in which the wire carrying the current tends to move; the three directions being mutually at right angles. By applying this rule to Fig. 3, it will be seen that at A the conductor 6 tends to move upward from the plane of the paper toward the reader. This condition also obtains at B. Conversely, because the current is in the opposite direction at C, the wire tends to move downward through the plane of the paper, and away from the reader. This condition also obtains at D. Thus, a turning moment is exerted around pivots 7 and bearings 8 (Fig. 2).

Current which flows through the winding of coil 2 similarly causes a turning moment around the axis of pivots 3 and bearings 4 because of reaction with the previously mentioned single magnetic field. Current from coil 2 is conveyed thereto and therefrom by means of hair springs 9. These are wound in opposite directions so that the net mechanical force is zero. The current flowing through conductor 6 is conveyed from the frame 5 to insulated stationary terminals by means of a similar pair of springs 10. The current from coil 2 is conveyed from frame 5 to insulated stationary terminals by a second set of hair springs 11. The resultant mechanical force of the combination of springs is again made zero.

Returning again to Fig. 1 numeral 12 indicates a magnet, or yoke. This may be either a permanent magnet or an electro-magnet. The magnet is provided with pole pieces 13 which have a cylindrical shape across the air gap. A center pole piece 14 has an inverted U shape when viewed in plan as in Fig. 1. This allows the working surface 1 to include the axis of rotation. It will be recognized that the reluctance of the air path between the sides of the center pole piece 14 and the pole pieces 13 is much greater than the reluctance of the ferromagnetic member 14. Thus, for all practical purposes, all the flux will flow through the member 14 and not in the interior space included between the arms of the U.

Two slots 15 are provided in the center piece 14 (Fig. 2) in order that the re-entrant portions 16 of winding 6 (Fig. 3) will have clearance. It will be seen that the portions 16 and 17 of winding 6 will not be influenced by the magnetic field since this flows through the center pole piece 14 and not in the space between the arms of the U. Consequently, only portion A, B, C, and D of winding 6 react with the magnetic field and the turning moment previously described results.

I prefer to construct the sides of the center pole piece 14 rectilinearly as shown in Fig. 1. This results in a somewhat weaker magnetic field at the center of the air gaps between pole pieces 13 and center piece 14. This acts as an automatic means for centering the coils 2 and 5. A coil carrying current seeks the weakest portion of a magnetic field.

It will be understood that electrical wave forms of any shape may be passed through the winding of coil 2 and frame 5, and that mechanical motion with respect to time corresponding thereto will be obtained. Thus, it is convenient to apply a triangular waveshape of electrical energy to the coil 2 and a sawtooth waveshape of electrical energy of lower frequency to frame 5 in order that the mirror 1 may systematically scan a field of view as in television. Sinusoidal and other waveshapes may, of course, be applied instead. At high frequencies, such as several hundred cycles where the inductive reactance coils and the mechanical inertia thereof become considerable, the derivative of the waveform of motion desired is the voltage to be impressed. For a sawtooth waveshape of motion the electrical voltage waveshape becomes a series of short unidirectional pulses, instead of the quick rise and the linear decay.

In certain cases where the centering forces must be considerable, as in airborne equipment, I have found that a ferrous strip 18 attached to coil 2 will conveniently increase the centering restoring force. This is because of the tendency of this member to position itself in line with the single magnetic field.

It will also be understood that variation of the strength of the single magnetic field may be used to modify or accentuate the motional waveforms. This is most conveniently accomplished in using an electromagnetic instead of a permanent magnet and varying the current through the coil 19 thereof. The derivative of the voltage waveform is desirable in overcoming the considerable inductance of this circuit. Increasing the strength of the magnetic field at the end of the motional excursion reduces the effect of mechanical inertia of the moving system. Phasing the currents through the coil 19 differently with respect to coils 2 or 6 further modifies the motional waveform.

Having thus fully described my invention I claim:

1. In an electromechanical device, means for producing a unidirectional magnetic field, a unidirectionally wound coil in said field, a bidirectionally wound coil in said field, the conductors of said latter coil being wound in opposite directions on opposite sides of a bisecting axis.

2. In an electromechanical device, means for producing a unidirectional magnetic field, a unidirectionally wound coil in said field, a bidirectionally wound coil in said field, the winding of said latter coil being clockwise in one quadrant, clockwise in the diagonally opposite quadrant and counter-clockwise in the two remaining quadrants.

3. In an electromechanical device, means for causing motion in plural dimensions by the flow of electric currents having the same instantaneous direction comprising; means for producing a unidirectional magnetic field, a unidirectionally wound coil in said field, a bidirectionally wound coil in said field, said currents flowing through said coils.

4. In an electromechanical device, means for causing motion in plural dimensions by the flow of electric currents comprising; means for producing a unidirectional magnetic field, a unidirectionally wound coil in said field adapted to rotate about an axis perpendicular to the direction of said field, a bidirectionally wound coil in said field adapted to rotate about an axis parallel to the direction of said field, said currents flowing through said coils.

5. Electromechanical means for deflecting a device defining a working area in plural dimensions, comprising; means for producing a unidirectional magnetic field surrounding said area, a conductor wound unidirectionally around the perimeter of said area, a frame surrounding said conductor, rotation permitting mounting means between said conductor and said frame, a conductor wound bidirectionally around said frame, stationary supports, rotation permitting mounting means between said frame and said supports, and means for conveying electrical energy to and from said conductors.

6. Electromechanical means for deflecting a device defining a working area in plural dimensions, comprising; a source of magnetomotive force, pole pieces attached thereto which surround the working area on opposite sides thereof, a unidirectionally wound coil around the perimeter of said area, a frame surrounding said coil, rotation permitting mounting means therebetween, a bidirectionally wound coil around said frame, stationary supports, rotation permitting mounting means therebetween, a center pole piece positioned between said pole pieces, surrounded by said two coils and surrounding said working area on opposite sides thereof.

7. In an electromechanical device, a magnetic structure comprising; a source of magnetomotive force, concave pole pieces attached thereto, a center pole piece positioned therebetween, the outer surface thereof having substantially rectilinear sides, the airgap thus formed having a greater length in the center than at the extremities thereof, the inner surface of the center pole piece lying close to the outer surface thereof, an airspace resulting in the center of the center pole piece of high reluctance relative to that of the material of the center pole piece.

8. In an electromechanical device, an electromagnetic structure comprising; pole pieces, a center pole piece, a unidirectionally wound coil and a bidirectionally wound coil therebetween, slots in said center pole piece through which the reentrant turns of said bidirectionally wound coil pass.

9. In an electromechanical device, a coil wound in four quadrants, the conductor of which is wound clockwise in one quadrant, then clockwise in the diagonally opposite quadrant, then counterclockwise in an adjacent quadrant and then counterclockwise in the remaining diagonally opposite quadrant.

10. In an electromechanical device, means for producing a unidirectional magnetic field, means for altering the intensity of said field, a unidirectionally wound coil in said field, a bidirectionally wound coil in said field, the conductors of said latter coil being wound in opposite directions on opposite sides of a bisecting axis.

11. In an electromechanical device, means for producing a unidirectional magnetic field, a unidirectionally wound coil in said field, a bidirectionally wound coil in said field, and a ferrotionally wound member in said field attached to said unidirectionally wound coil parallel to the projection of the direction of the conductors thereof upon the plane of the magnetic field.

12. An electromechanical device comprising, means for establishing magnetic flux in a magnetic circuit comprising, a yoke, pole pieces, and a center pole piece, said center pole piece being hollow, a device defining a working area within said hollow, a unidirectionally wound coil surrounding said area and extending into the air gap formed between the outer surface of the center pole piece and the inner surfaces of said pole pieces, a frame surrounding said coil, mounting means permitting rotation therebetween, a bidirectionally wound coil attached to the periphery of said frame, stationary supports, mounting means permitting rotation between said frame and said supports, and a ferromagnetic member attached to said unidirectionally wound coil and extending adjacent to said pole pieces.

13. Means for producing a magnetic field, a coil disposed within the field produced by said means and mounted for rotation about an axis parallel to said field, a magnetic structure within said coil, said coil being so wound and said magnetic structure being so disposed that energization of said coil causes it to turn about said axis.

14. Means for producing a magnetic field, a coil disposed within the field produced by said means and mounted for rotation about an axis parallel to said field, a magnetic structure within said coil, said coil being so wound and said magnetic structure so disposed that alternating current energization of said coil causes it to oscillate about said axis.

15. Means for producing a magnetic field, a coil disposed within the field produced by said means and mounted for rotation about an axis parallel to said field, a magnetic structure within said coil, said coil being so wound and said magnetic structure being so disposed that energization of said coil causes it to turn about said axis; a second coil disposed within said field and mounted for rotation about an axis perpendicular to said field, said second coil being so wound and so disposed with respect to said magnetic structure that energization of said second coil causes it to turn about said perpendicular axis.

16. Means for producing a magnetic field, a coil disposed within the field produced by said means and mounted for rotation about an axis, a magnetic structure within said coil, said coil being so wound and said magnetic structure being so disposed that energization of said coil causes it to turn about said axis; a second coil disposed within said field and mounted for rotation about an axis substantially at right angles to said first axis, said second coil being so wound and so disposed with respect to said magnetic structure that energization of said second coil causes it to turn about said second axis.

HARRY R. LUBCKE.

REFERENCES CITED

The following references are of record in the file of this patent:

UNITED STATES PATENTS

| Number | Name | Date |
| --- | --- | --- |
| 2,296,754 | Wolf et al. | Sept. 22, 1942 |
| 1,873,926 | Centeno | Aug. 23, 1932 |
| 1,604,478 | Orton | Oct. 26, 1926 |